Patented July 5, 1938

2,122,882

UNITED STATES PATENT OFFICE 2,122,882

ANTHRAQUINONE COMPOUNDS AND METHOD FOR THEIR PREPARATION

Wilbert A. Herrett, Hamburg, N. Y., assignor to National Aniline & Chemical Company, Inc., New York, N. Y., a corporation of New York No Drawing. Application January 13, 1936, Serial No. 58,875

13 Claims. (Cl. 260—60)

This invention relates to new and useful anthraquinone compounds and to methods for their preparation.

I have found that 2-amino-1,4-bis-acylamino-anthraquinones, which may be represented by the general formula:

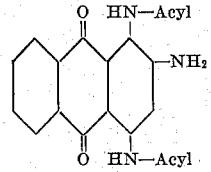

may be derived from the corresponding 2-nitro-1,4-bis-acylamino-anthraquinone compounds by reduction with ammonium sulphide in a highly satisfactory manner yielding substantially quantitative yields of the reduction product. This is the more surprising in view of the fact that attempts to reduce the nitro group of 2-nitro-1,4-bis-acylamino-anthraquinones to an amino group by means of sodium sulphide were found to be unsatisfactory for producing practical yields of the reduction product. Reduction products so produced were of relatively poor quality and represent only a fraction of the material treated.

The nitro-acylamino-anthraquinone may be treated to advantage in the form of a slurry in a suitable aqueous medium, e. g. in 3 or more times its weight of an aqueous solution containing from 2% to saturation but preferably between about 3% and about 10% by weight of ammonium sulphide. It is preferable that the weight ratio of acylamino compound to reducing liquid lie between 1:10 and 1:20. In this way a reaction mixture may be obtained which is sufficiently fluid to be easily stirred, transferred, or otherwise handled as occasion demands.

Examples of suitable liquid media for carrying out the reaction are aqueous methanol, ethanol, isopropyl alcohol, acetone, etc. In general such media should be inert under the conditions of reaction, should wet the nitro bis-acylamino compounds, and at the same time should be miscible with the aqueous solution of ammonium sulphide.

The total amount of ammonium sulphide which is required, as will be understood by those skilled in the art, depends upon the amount and molecular weight of the particular nitro compound being reduced, and an excess over the stoichiometrical amount is desirable. In general, by increasing the quantity of ammonium sulphide present in the reaction mixture, the rate of the reduction may be increased. The reaction may, if desired, be started with a small amount of ammonium sulphide and then, as the reduction progresses, more sulphide may be added to insure the presence of sufficient thereof in the slurry to complete the reaction. Usually a total amount of ammonium sulphide equal to from about 2 mols to about 10 mols per mol. of the nitro-bis-acylamino-compound treated is sufficient to ensure complete reduction, and preferably an amount equal to from about 4 mols to about 6 mols per mol. of 2-nitro-1,4-bis-acylamino-anthraquinone compound is used.

The reduction of the nitro compound by ammonium sulphide proceeds slowly at temperatures below about 45° C. but the rate of reaction is substantially increased by raising the temperature of the reaction mixture, particularly if said temperature approaches the boiling point of the slurry. It is preferred to conduct the reduction at a temperature between about 60° C. and about 75° C. in which range of temperatures the reduction proceeds rapidly but smoothly and complete reaction usually is obtained in between about 1 and about 6 hours without appreciable loss of materials by evaporation or decomposition.

The color of the acylamino compound changes during the course of the reduction, usually from a reddish orange color to a reddish brown. Accordingly the progress of the reaction may be determined by warming a sample of the reaction mixture in the presence of an excess of ammonium sulphide. If no further color change is obtained by this test, the reduction may be adjudged complete. The resulting 2-amino-1,4-bis-acylamino-anthraquinone may be recovered from the reaction mixture by cooling the same and filtering or centrifuging. The amino compound which is thus obtained may be washed with cold water until free from water-soluble impurities and then dried in any suitable manner.

The process of this invention is illustrated by the following examples, the parts being by weight.—

*Example 1.*—About 10 parts of 2-nitro-1,4-bis-benzoylamino-anthraquinone were suspended in about 117 parts of commercial denatured ethyl alcohol and about 32 parts of a saturated aqueous solution of ammonium sulphide (NH4)2S were added thereto. The resulting slurry was agitated rapidly and heated slowly to about 75° C. at which temperature it was maintained for about two hours. At the end of this time no further color change was observed upon addition of an excess of ammonium sulphide to a sample of the reaction mixture, but stirring was continued for about one-half hour to ensure that the reaction was complete. The slurry was then cooled and the brownish colored amorphous product was filtered off, washed with water until the washes showed no trace of water-soluble impurities, and then dried in the air at about 100° C.

The 2-amino-1,4-bis-benzoylamino-anthraquinone thus obtained is insoluble in alcohol, very slightly soluble in glacial acetic acid, and only slightly soluble in cold dichlorbenzene, aniline, or nitrobenzene. It is readily soluble, however, in hot dichlorbenzene, aniline, or nitrobenzene and dissolves in cold 95% sulfuric acid yielding a reddish-orange solution from which it may be precipitated as bright orange flocks by the addition of water.

*Example 2.*—About 30 parts of 2-nitro-1,4-bis-(ortho-chlorbenzoyl)-amino-anthraquinone were suspended in about 234 parts of commercial denatured alcohol and about 65 parts of a saturated aqueous solution of ammonium sulfide $(NH_4)_2S$ were added thereto. The resulting slurry was rapidly agitated and warmed to about 32° C. at which temperature the reaction mixture was stirred for about one-half hour. The temperature was then raised to about 72° C. and the reaction mixture was stirred for an additional half hour, at the end of which time the reduction was complete. The slurry was cooled and the brownish-red, somewhat crystalline 2-amino-1,4-bis-(ortho-chlorbenzoyl)-amino-anthraquinone was filtered off, washed with water until free from water-soluble impurities, and then dried in vacuo at about 100° C.

The product, 2-amino-1,4-bis-(ortho-chlorbenzoyl)-amino-anthraquinone, is insoluble in alcohol, very slightly soluble in glacial acetic acid and but sparingly soluble in cold dichlorbenzene, aniline, or nitrobenzene. It dissolves rapidly, however, in hot dichlorbenzene, aniline, or nitrobenzene and is readily soluble in 95% sulfuric acid and in 26% oleum. In the case of sulfuric acid a brownish-red solution results which precipitates pale orange flocks upon dilution with water and in the case of oleum the solution is blue.

As will be understood, the present process is not limited to the details of the above examples but changes therein may be made without departing from the scope of the invention.

The compounds of the present invention are valuable intermediates for the preparation of dyes and may be easily converted into other important intermediates. For example, 2-amino-1,4-bis-benzoylamino-anthraquinone and 2-amino-1,4-bis-ortho chlorbenzoylamino-anthraquinone by treatment with benzoyl-chloride may be directly converted into 1,2,4-tribenzoylamino anthraquinone and 1,4-di-orthochlorbenzoylamino-2-benzoylamino-anthraquinone respectively; or by heating with sulphuric acid and subsequently treating with benzoyl-chloride, they may be reacted to form 4-benzoylamino-1,2-phenyl-anthrimidazole and 4-benzoylamino-1,2-orthochlorphenyl-anthrimidazole respectively; or, if desired, they may be converted by suitable methods into 1,2,4-triamino-anthraquinone.

I claim:

1. Process for the preparation of a 2-amino-1,4-bis-acylamino-anthraquinone, which comprises subjecting a 2-nitro-1,4-bis-acylamino-anthraquinone to the action of ammonium sulphide.

2. Process for the preparation of a 2-amino-1,4-bis-acylamino-anthraquinone, which comprises subjecting a 2-nitro-1,4-bis-acylamino-anthraquinone in an aqueous reaction medium to the action of ammonium sulphide.

3. Process for the preparation of a 2-amino-1,4-bis-acylamino-anthraquinone, which comprises subjecting a slurry of the corresponding 2-nitro-1,4-bis-acylamino-anthraquinone to the action of ammonium sulphide, said ammonium sulphide being present in amount not less than 2% of the weight of the liquid portion of the slurry and not greater than the amount required for saturation thereof.

4. Process for the preparation of a 2-amino-1,4-bis-acylamino-anthraquinone, which comprises subjecting an aqueous slurry of the corresponding 2-nitro-1,4-bis-acylamino-anthraquinone to the action of ammonium sulphide, said ammonium sulphide being present in amount equal to from about 3% to about 10% of the weight of the liquid portion of the slurry.

5. A process for the preparation of a 2-amino-1,4-bis-acylamino-anthraquinone, which comprises subjecting the corresponding 2-nitro-1,4-bis-acylamino-anthraquinone to the action of an amount of ammonium sulphide equal to from about 2 mols to about 10 mols per mol. of said nitro compound in the presence of a liquid reaction medium, said reaction medium being present in amount equal to at least three times the weight of said nitro compound.

6. A process for the preparation of a 2-amino-1,4-bis-acylamino-anthraquinone, which comprises subjecting the corresponding 2-nitro-1,4-bis-acylamino-anthraquinone dispersed in about 10 to about 20 times its weight of an inert liquid to the action of ammonium sulphide at a temperature not less than about 45° C.

7. A process for the preparation of a 2-amino-1,4-bis-acylamino-anthraquinone, which comprises subjecting the corresponding 2-nitro-1,4-bis-acylamino-anthraquinone dispersed in about 10 to about 20 times its weight of an aqueous-alcohol solution to the action of ammonium sulphide at a temperature between about 60° C. and about 75° C. until the color of the solid material in the reaction mixture shows no further change upon addition of excess ammonium sulphide thereto, cooling, and separating the resultant amino compound.

8. A process for the preparation of a 2-amino-1,4-bis-acylamino-anthraquinone, which comprises subjecting the corresponding 2-nitro-1,4-bis-acylamino-anthraquinone dispersed in about 10 to about 20 times its weight of an aqueous-alcohol solution to the action of ammonium sulfide in a concentration between about 3% and about 10% of the weight of said solution, vigorously agitating the reaction mixture at a temperature between about 60° C. and about 75° C. for between about 1 and about 6 hours, cooling the slurry, and recovering the resultant amino compound.

9. A process for the preparation of 2-amino-1,4-bis-benzoylamino-anthraquinone which comprises suspending about 10 parts of 2-nitro-1,4-bis-benzoylamino-anthraquinone in about 117 parts of commercial denatured alcohol, adding thereto about 32 parts of a saturated aqueous solution of ammonium sulphide, stirring the resulting slurry, heating said slurry slowly to a temperature of about 75° C., maintaining said slurry at said temperature for about 2½ hours, cooling said slurry, filtering said last named slurry whereby the 2-amino-1,4-bis-benzoylamino anthraquinone is separated therefrom, washing said last named compound with water, and drying said compound.

10. A process for the preparation of 2-amino-1,4-bis-(ortho-chlorbenzoyl)-amino-anthraquinone which comprises suspending about 30 parts of 2-nitro-1,4-bis-(ortho-chlorbenzoyl)-amino anthraquinone in about 234 parts of commercial denatured alcohol, adding thereto about 65 parts of a saturated aqueous solution of ammonium sulfide, agitating the resulting slurry at a temperature of about 32° C. for about ½ hour, elevating the temperature of the slurry to about 72° C., stirring at said last named temperature for about ½ hour, cooling the resulting slurry, filtering said last named slurry whereby the 2-amino-1,4-bis-(ortho-chlorbenzoyl)-amino-anthraquinone is separated therefrom, washing said last named compound free from water-soluble impurities, and drying it.

11. As a new product a 2-amino-1,4-bis-acyl-amino anthraquinone in which the acyl group is a member of the class consisting of benzoyl and its halogen derivatives.

12. As a new product 2-amino-1,4-bis-benzoyl-amino-anthraquinone.

13. As a new product 2-amino-1,4-bis-(ortho-chlorbenzoyl)-amino-anthraquinone.

WILBERT A. HERRETT.